United States Patent [19]

Dawson

[11] Patent Number: 4,721,854

[45] Date of Patent: Jan. 26, 1988

[54] QUADRUPOLE MASS SPECTROMETER

[75] Inventor: Peter H. Dawson, Ottawa, Canada

[73] Assignee: Canadian Patents & Development Ltd., Ottawa, Canada

[21] Appl. No.: 877,166

[22] Filed: Jun. 23, 1986

[30] Foreign Application Priority Data

Dec. 11, 1985 [CA] Canada .................................. 497422

[51] Int. Cl.[4] ............................................. B01D 59/44

[52] U.S. Cl. ..................................... 250/290; 250/292

[58] Field of Search ......................... 250/281, 290, 292

[56] References Cited

U.S. PATENT DOCUMENTS

| | | | |
|---|---|---|---|
| 3,920,986 | 11/1975 | Fies | 250/290 |
| 3,935,452 | 1/1976 | Prince | 250/292 |
| 4,090,075 | 5/1978 | Brinkmann | 250/292 |
| 4,189,640 | 2/1980 | Dawson | 250/290 |
| 4,535,236 | 8/1985 | Batey | 250/292 |

*Primary Examiner*—Bruce C. Anderson
*Attorney, Agent, or Firm*—Y. Toyooka

[57] ABSTRACT

This disclosure presents an alternative, improved approach to the RF only quadrupole mass spectrometers. The ions whose masses place them near the stability limit for a given operating voltage and RF frequency, can be strongly influenced by the application of a very small dc voltage to the quadrupole rods. If this voltage is modulated at a low frequency (typically a few hundred hertz), the (a,q) values will pass alternately through the stability boundary and ions will be transmitted with the imposed frequency. The advantages of the new approach are two-fold (a) lock-in amplifier synchronous detection schemes can be used. These give improved signal/noise ratios. Background noise due to photons, soft X-rays or excited neutrals—often a problem in quadrupole mass filters—will not be modulated and will not be detected. (b) Higher resolution can be achieved.

10 Claims, 6 Drawing Figures

QUADRUPOLE MASS SPECTROMETER

FIELD OF THE INVENTION

This invention relates to a method and apparatus for mass analysis by a quadrupole mass spectrometer in which ions are subjected to mass separation by an alternating electric field of high frequency within a mass spectrometer.

BACKGROUND OF THE INVENTION

The quadrupole mass spectrometers are well known in the art and find themselves applied in a variety of fields wherein ions are analyzed according to their m/e values, m being the mass of an ion and e its electrical charge.

As shown in U.S. Pat. Nos. 3,334,225, Aug. 1, 1967 (Langmuir), 3,413,463, Nov. 26, 1968 (Brubaker) and 4,214,160, July 22, 1980 (Fies et al), quadrupole mass spectrometers are normally operated using combined radiofrequency (RF) and continuous (DC) voltages applied to the rod electrodes. In this moade of operation, $V_{RF}$, voltage of the RF, and $V_{DC}$, voltage of the DC, are set in such a way that the mass spectrometer operates in the stability region (the first region of stability) near the origin depicted in the well known (a,q) diagram. Problems arise under these conditions in achieving (a) good transmission at high mass, (b) good resolution in a structure which can be cheaply manufactured and (c) consistently good peak shape. To avoid some of those problems, an RF-only quadrupole mass spectrometer was first described in U.S. Pat. No. 4,090.075, May 16, 1978 (Brinkman). Further improvements have been patented in the U.S. Pat. No. 4,189,640 Feb. 19, 1980 (Dawson) and British Pat. No. 1,539,607, Jan. 31, 1979 (Leck). In the RF-only quadrupole mass spectrometers, steps in the ion transmission versus voltage amplitude curves occur as each type of ion passes beyong the stability boundary. In the patent to Brinkman, step signals are converted to mass peak signals by the use of retarding electrodes or a mass analyzer at the output end of the quadrupole electrodes. The patent to Leck, on the other hadn, uses an annular detector for desired ions and a central electrode surrounded by the annular detector for unwanted ions. Dawson employs a centrally located "stop" to eliminate ions of higher mass with stable trajectories which generate background and associated noise. In their article in Dynamic Mass Spectrometry No. 5 (1978) pages 41-54, Chapter 2 "Modulation Techniques Applied to Quadrupole Mass Spectrometer", Weaver and Mathers report the use of modulation of the RF voltage amplitude to differentiate signals for converting the steps to mass peaks. Although the RF-only quadrupole mass spectrometers have proven very successful, this technique of Weaver and Mathers did not find application because noise on large transmitted signals prevented the detection of small signals, i.e. limited synamic range.

SUMMARY OF THE INVENTION

This disclosure discusses an alternative, improved technique which can be applied to the RF only quadrupole mass spectrometers.

Briefly stated, the present invention resides in a quadrupole mass spectrometer having quardrupole rod electrodes mutually arranged in parallel with each other, an RF control unit connected to the said quadrupole rod electrodes to generate an RF field for mass filtering of ions in the RF-only mode within the stability boundary of the (a,q) values, an ion source near one end of the quadrupole rod electrodes to introduce to the RF field a beam of ions to be analyzed, and a detector near the other end of the quadrupole rod electrodes to detect ions transmitted through the RF field and to produce a detector signal, the invention being characterized in that a modulation voltage source for producing a modulation voltage of a low frequency whose period is long compared to the flight time of the ions in the RF field, superimposing means for superimposing the modulation voltage on the RF field so that the (a,q) values will pass alternately through the stability boundary and the ions will be transmitted with the said low frequency, and a lock-in amplifier connected to the detector for amplifying the detector signal in synchronism with the said low frequency.

In other embodiments, the present invention resides in a quadrupole mass spectrometer having quadrupole rod electrodes mutually arranged in parallel with each other, an RF control unit connected to the said quadrupole rod electrodes to generate an RF field for mass filtering of ions in the RF-only mode within the stability boundary of the (a,q) values, an ion source near one end of the quadrupole rod electrodes to introduce to the RF field a beam of ions to be analyzed, and a detector near the other end of the quadrupole rod electrodes to detect ions transmitted through the RF field the invention being characterised in a method in that superimposing on the RF field a modulation voltage of a low frequency whose period is long compared to the flight time of the ions in the RF field so that the (a,q) values will pass alternately through the stability boundary and the ions will be transmitted with the said low frequency, and amplifying the detector signal in synchronism with the said low frequency.

BRIEF DESCRIPTION OF THE DRAWINGS

The invention will be readily understood from the following detailed description of the present quadrupole mass spectrometer and method of analyzing ions, taken in conjuction with the accompanying drawings in which.

DETAILED DESCRIPTION OF THE PREFERRED EMBODIMENTS

Figure 1:
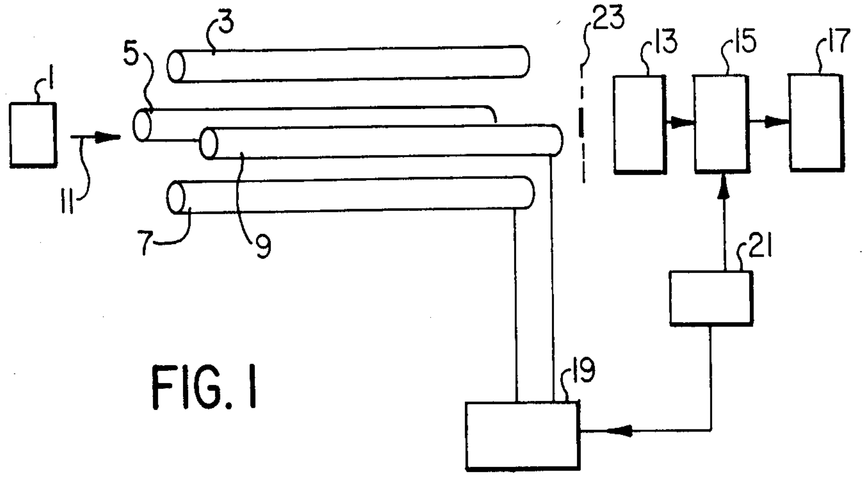
FIG. 1 schematically shows a quadrupole mass spectrometer according to the present invention.

Shown in FIG. 1 is a quadrupole mass spectrometer according to the present invention in which an ion source 1 is positioned near one end of quadrupole rod electrodes 3, 5, 7 and 9. The rod electrodes are arranged mutually in parallel with each other and symetrically with a central axis along which a beam of ions is introduced as shown by an arrow 11. At the other end of the rod electrodes is located a detector 13 which produces a detector signal which is in turn fed to a lock-in amplifier 15. A display unit 17 receives the detector signal via the lock-in amplifier 15.

The quadrupole rod electrodes are supplied with an RF voltage by an RF control unit 19. A modulation voltage source 21 produces a modulation voltage of a low frequency which is superimposed on the RF voltage at the quadrupole rod electrodes via the RF control unit 19. The modulation voltage is also applied to the lock-in amplifier 15. A central stop 23 such as that taught in the above U.S. patent to Dawson can be provided betwen the quadrupole rod electrodes and the detector. The central stop 23 is biased negatively for positive ions and positively for negative ions.

The operation of the mass spectrometer as shown in FIG. 1 is now explained below.

Figure 2:
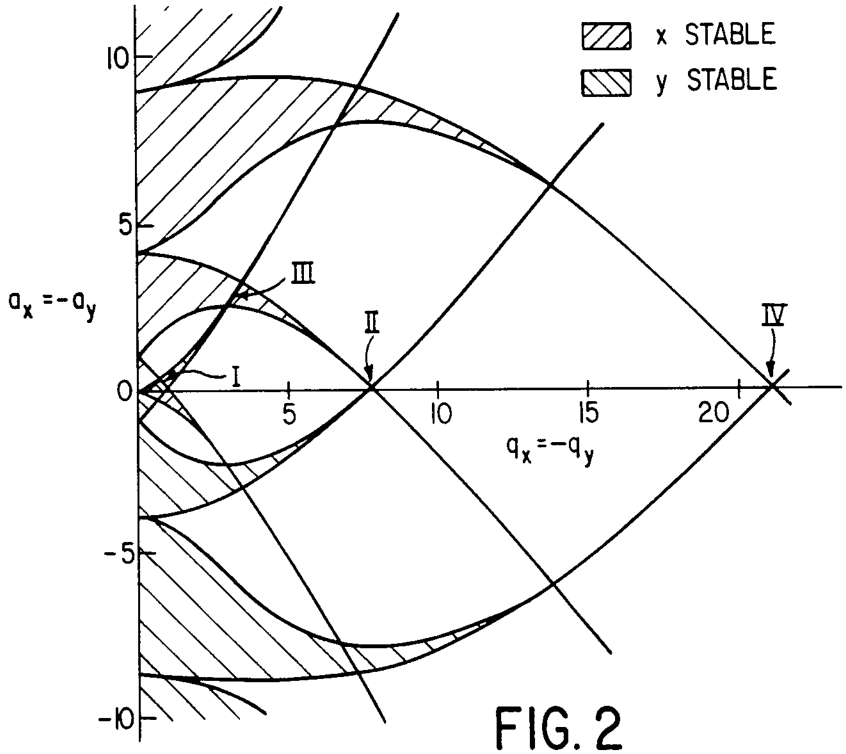
FIG. 2 is a stability (a,q) diagram of the quadrupole mass spectrometer.
Figure 3:
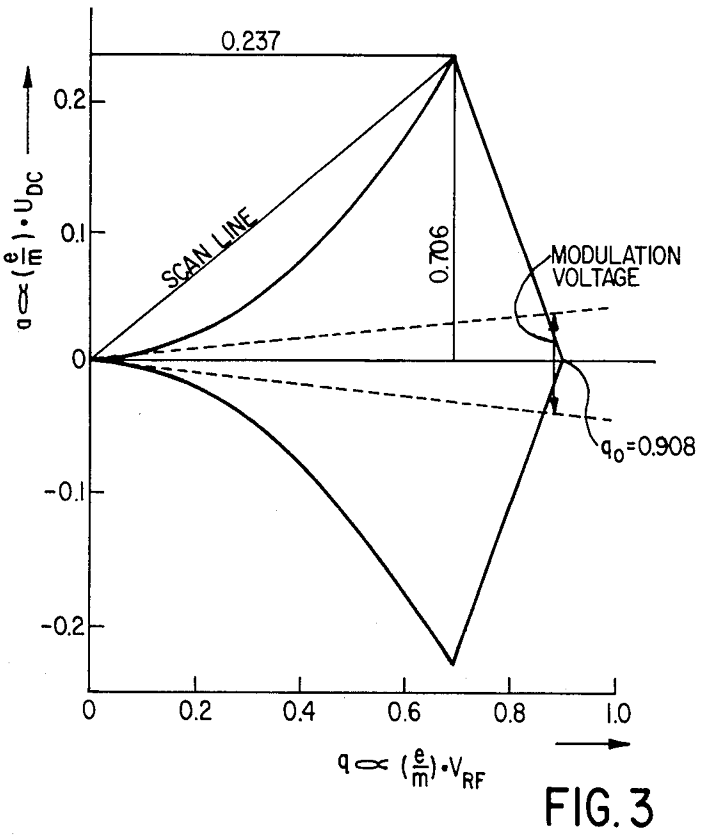
FIG. 3 is a detailed stability (a,q) diagram of Region labelled I (the first region) shown in FIG. 2.

FIG. 2 shows a general view of Mathieu stability diagram for the quadrupole mass spectrometer found in the article entitled "The Second Stability Region of the Quadrupole Mass Filter. I. Ion Optical Properties" by P. H. Dawson and Yu Bingqi, International journal of Mass Spectrometry and Ion Properties, Volume 56 (1984) pages 25–39. The figure indicates regions labelled I, II, III and IV of simultaneous stability in both x and y transverse directions. The diagram is plotted in a-q space with $a=4eU/m\omega^2r_o^2$ and $q=2eV/m\omega^2r_o^2$ where $r_o$ is half the distance between opposite pairs of rod electrodes, m is the ionic mass, e the charge on the ion, U is the applied DC voltage and V cos wt is the applied RF voltage between opposite pairs of rod electrodes. Region 1, near the origin is that used in normal mass filter operation. FIG. 3 is an enlarged view of Region I. The sharp "tip" of this region intersected by a scan line near q=2.98a is used to obtain mass-dependent transmission.

In the RF-only mode of operation, U=O, $V_{RF}=V$ cos ωt a scan line in the a-q space falls into the axis q because a equals 0. In this case the trajectories of ions of a certain mass number remain stable as long as the value of parameter q is lower than $q_o=0.908$. Further increase of V will result in instability of trajectories of these ions, thereby producing a step spectrum like that shown in FIG. 3 of the patent to Brinkman. The said figure of Brinkman shows a step spectrum when there are ions of different mass numbers $M_1$ and $M_2$ ($M_1<M_2$). In this instance, the instability point ($q_o=0.909$ will be reached by M1 at voltage $V_1$ and by $M_2$ at voltage $V_2$ different from $V_1$.

As stated earlier, the patents to Brinkman and Leck suggest two ways of converting the stepwise signals into mass peak signals.

Figure 4:
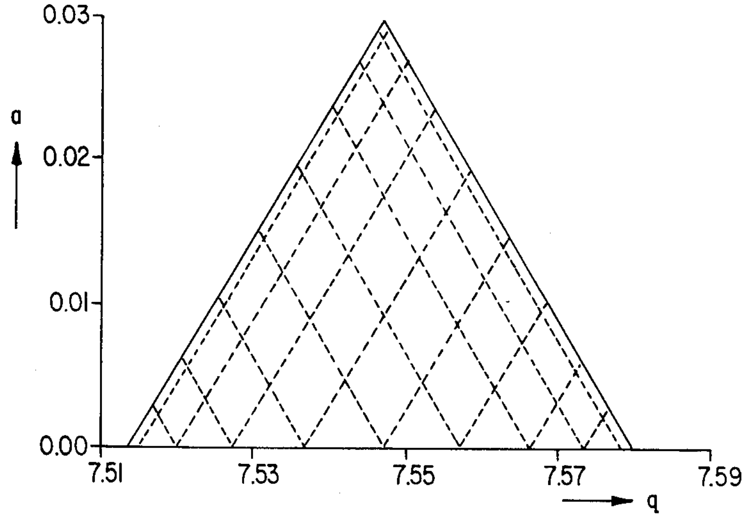
FIG. 4 is a detailed stability (a,q) diagram of Region labelled II (the second region) shown in FIG. 2.

As seen in FIG. 2 and reported in the above-referenced article by Dawson and Bingqi, the quadrupole mass spectrometer can be operated in a stability region labelled II near a=o, q=7.547. FIG. 4 shows an enlarged region II.

The present invention relates to the RF-only quadrupole mass spectrometer in which a very small modulation voltage is applied to the rod electrodes and this voltage is modulated at a low frequency. In other words unlike Weaver and Mathers referred to above, a modulation is imparted on parameter a rather than on parameter q. Then the problem of limited dynamic range can be avoided if the modulation is applied to an RF only quadrupole which does not transmit many different ions simultaneously.

The modulation frequency is typically a few hundred hertz, that is to say, its period must be long compared to the flight time of ions through the field within the quadrupole mass spectrometer. When parameter a is modulated, the (a,q) values will pass alternately through the stability boundary and ions will be transmitted with the imposed frequency.

The modulation voltage can be sinusoidal, square waved, sawtoothed or the like.

This technique of modulating parameter a can also be used in the quadrupole mass spectrometer operating in the second stability region (region II).

The modulated ion transmission permits the use of lock-in amplifier synchronous detection which gives improved signal/noise ratios because background noise due to photons, soft X-rays or excited neutrals—often a problem in quadrupole mass spectrometers—will not be modulated and will not be detected. Higher resolution can also be achieved. The resolution can be varied as the amplitude of the modulation voltage is changed.

(A) THE RF ONLY QUADRUPOLE WITH ANNULAR DETECTION

Different collector geometries have been used but the approaches are similar in principle. Ions having q values near 0.908 have trajectories on the verge of instability and will have large displacements from the axis. They can be distinguished from ions with stable trajectories by using an annular collector. The collector geometry in these experiments involved a gridded electrode with a central "stop" interposed between the quadrupole exit and the on-axis electron multiplier. A 20 cm long quadrupole was used with ion detection which involves analog detection with a current/voltage converter and a lock-in amplifier operating at a few hundred hertz. As seen in FIG. 3 ions having q values close to 0.908 will be moved in and out of the stable area by the modulation of their a value, giving a modulated ion transmission. The modulation should ideally be applied in equal and opposite amounts to opposite sets of rod electrodes. In these demonstration experiments, it was applied to only one set of rods so that the quadrupole axis potential was also varying slightly.

Figure 5:
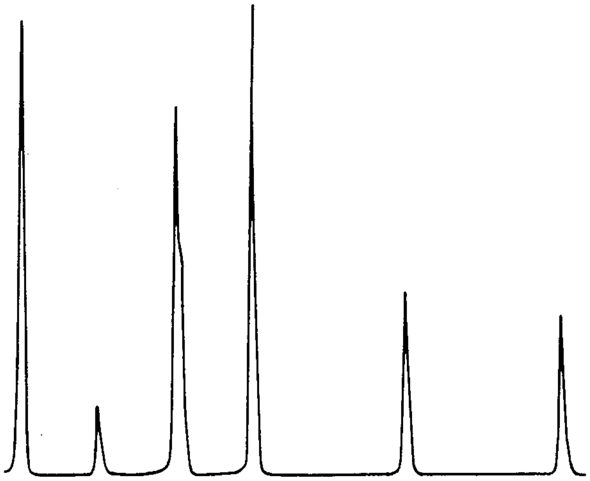
FIG. 5 is a part of the mass spectrum of a xenon/-fluorinated hydrocarbon mixture obtained according to the present invention.

FIG. 5 shows, as an example, part of a xenon/-fluorinated hydrocarbon mixture using an RF frequency of 3 MHz, an ion energy of 1.5 eV and a modulation amplitude of about one volt. The half-height resolution is about 1700. Note that the m/z=131 is an unresolved doublet. The resolution is of the order expected from a calculation of a and a knowledge of the stability diagram.

The resolution varied with the modulation voltage very approximately as $V^{-0.5}$. On a simple picture, one would expect a linear dependence.

(B) THE SECOND REGION QUADRUPOLE

The second region as seen in FIG. 4 has a width along the q axis corresponding to a resolution of about 114. An a value greater than 0.03 will completely remove ions from the stable region. It is necessary to use high energy ions to overcome fringing field effects but very few RF cycles are necessary in the field in order to achieve good resolutions.

Figure 6:
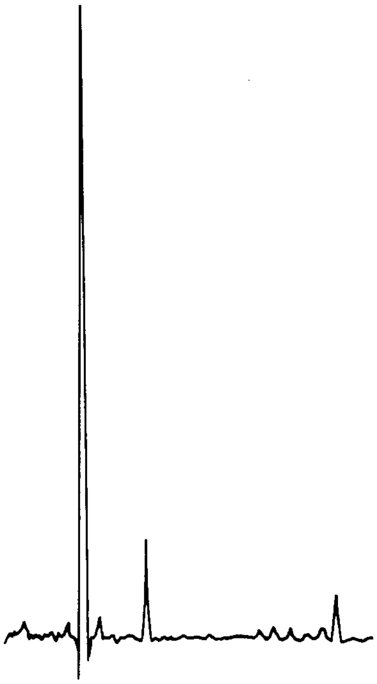
FIG. 6 is a part of the spectrum of air and residual gases obtained according to the present invention.

In these experiments, a 5 cm long homemade quadrupole with 0.63 cm diameter rod electrodes was used and operated at a frequency of 1.5 MHz. FIG. 6 shows part of a spectrum of air and residual gases at a pressure of $1.6\times10^{-6}$ torr obtained using ions of 400 eV energy and a modulation voltage of 6 volts. The modulation of a was large enough to remove the ions completely from the stable region. In the second region, the edges of the peaks always showed an out-of-phase component which appears in the spectrum as a negative excursion. Apparently at the very edge of the stability diagram a small DC offset can slightly increase the transmission. Note that the modulation technique may help to minimize problems due to simultaneous transmission of ions in region I.

What is claimed is:

1. In a vacuum quadrupole mass spectrometer having:

quadrupole rod electrodes mutually arrranged in parallel with each other, an RF control unit connected to the said quadrupole rod electrodes to generate an RF field for mass filtering of ions in the RF-only mode within the stability boundary of the (a,q) values, an ion source near one end of the quadrupole rod electrodes to introduce to the RF field a beam of ions to be analyzed; and detector near the other end of the quadrupole rod electrodes to detect ions transmitted through the RF field and to produce a detector signal; the invention being characterized in that a modulation voltage source for producing a modulation voltage of a low frequency whose period is long compared to the flight time of the ions in the RF field;

superimposing means for superimposing the modulation voltage on the RF field so that the (a,q) values will pass alternately through the stability boundary and the ions will be transmitted with the said low frequency; and a lock-in amplifier connected to the detector for amplifying the detector signal in synchronism with the said low frequency.

2. The quadrupole mass spectrometer according to claim 1 wherein:

the said RF control unit generates an RF field for mass filtering of ions in the RF-only mode within the first region of the stability boundary of the (a,q) values.

3. The quadrupole mass spectrometer according to claim 1 wherein:

the said RF control unit generates an RF field for mass filtering of ions in the RF-only mode within the second region of the stability boundary of the (a,q) values.

4. The quadrupole mass spectrometer according to claim 2 wherein:

the frequency of the RF field is 3 MHz and the amplitude of the modulation voltage is about one volt.

5. The quadrupole mass spectrometer according to claim 3 wherein the frequency of the RF field is 1.5 MHz and the amplitude of the modulation voltage is about 6 volts.

6. In a vacuum quadrupole mass spectrometer having quadrupole rod electrodes mutually arranged in parallel with each other, an RF control unti connected to the said quadrupole rod electrodes to generate an RF field for mass filtering of ions in the RF-only mode within the stability boundary of the (a,q) values, an ion source near one end of the quadrople rod electrodes to introduce to the RF field a beam of ions to be analyzed, and a detector near the other end of the quadrupole rod electrodes to detect ions transmitted through the RF field and to produce a detector signal, the invention being characterised in a method in that superimposing on the RF field a modulation voltage of a low frequency whose period is long compared to the flight time of the ions in the RF field so that the (a,q) values will pass alternately through the stability boundary and the ions will be transmitted with the said low frequency, and amplifying the detector signal in synchronism with the said low frequency.

7. The method according to claim 6 wherein the RF control unit is set to generate an RF field for mass filtering of ions in the RF-only mode witin the first region of the stability boundary of the (a,q) values.

8. The method according to claim 6 wherein the RF control unit is set to generate an RF field for mass filtering of ions in the RF-only mode within the second region of the stability boundary of the (a,q) values.

9. The method according to claim 7 wherein the frequency of the RF field is 3 MHz and the amplitude of the modulation voltage is about one volt.

10. The method according to claim 8 wherein the frequency of the RF field is 1.5 MHz and the amplitude of the modulation voltage is about 6 volts.

* * * * *